United States Patent
Yang et al.

(10) Patent No.: US 9,323,965 B2
(45) Date of Patent: Apr. 26, 2016

(54) METHOD FOR CHOOSING RFID COMMUNICATION MODE AND RFID DEVICE WHICH SUPPORTS NEAR-FIELD AND FAR-FIELD COMMUNICATION

(71) Applicant: Electronics and Telecommunications Research Institute, Daejeon-si (KR)

(72) Inventors: Hoe-Sung Yang, Daejeon-si (KR); Chan-Won Park, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 277 days.

(21) Appl. No.: 14/011,123

(22) Filed: Aug. 27, 2013

(65) Prior Publication Data
US 2014/0077933 A1    Mar. 20, 2014

(30) Foreign Application Priority Data
Sep. 19, 2012  (KR) .................. 10-2012-0104113

(51) Int. Cl.
*H04Q 5/22*  (2006.01)
*G06K 7/10*  (2006.01)

(52) U.S. Cl.
CPC ........ *G06K 7/10198* (2013.01); *G06K 7/10237* (2013.01)

(58) Field of Classification Search
None
See application file for complete search history.

(56) References Cited

U.S. PATENT DOCUMENTS

| | | |
|---|---|---|
| 7,346,061 B2 | 3/2008 | Takayama et al. |
| 7,679,514 B2 | 3/2010 | Rofougaran et al. |
| 8,022,825 B2 | 9/2011 | Rofougaran et al. |
| 8,063,769 B2 | 11/2011 | Rofougaran |
| 8,093,990 B2 | 1/2012 | Rofougaran et al. |
| 8,115,598 B2 | 2/2012 | Rofougaran et al. |
| 8,207,825 B2 | 6/2012 | Rofougaran et al. |
| 8,224,243 B2 | 7/2012 | Takayama et al. |
| 8,237,566 B2 | 8/2012 | Rofougaran et al. |
| 8,339,258 B2 | 12/2012 | Rofougaran et al. |
| 8,417,184 B2 | 4/2013 | Takayama et al. |
| 8,432,285 B2 | 4/2013 | Rofougaran et al. |
| 2007/0178935 A1 | 8/2007 | Shim et al. |
| 2008/0238619 A1 | 10/2008 | Rofougaran et al. |
| 2008/0238621 A1 | 10/2008 | Rofougaran et al. |
| 2008/0238623 A1 | 10/2008 | Rofougaran et al. |
| 2008/0238624 A1 | 10/2008 | Safarian et al. |
| 2008/0238688 A1 | 10/2008 | Rofougaran et al. |

(Continued)

FOREIGN PATENT DOCUMENTS

| | | |
|---|---|---|
| KR | 10-0746875 B1 | 8/2007 |
| KR | 10-0988813 B1 | 10/2010 |

(Continued)

*Primary Examiner* — Ojiako Nwugo
(74) *Attorney, Agent, or Firm* — Rabin & Berdo, P.C.

(57) ABSTRACT

Provided is a method of choosing a communication mode of an RFID device which supports near-field communication and far-field communication, including: interrupting generation of a self RF field signal; determining whether or not an RF field signal for near-field communication is detected; choosing the near-field communication mode when an external RF field signal for near-field communication is detected; and generating the self RF field signal for far-field communication when the external RF field signal for near-field communication is not detected, and choosing the communication mode according to whether or not a response signal is received.

9 Claims, 4 Drawing Sheets

(56) References Cited

U.S. PATENT DOCUMENTS

| | | |
|---|---|---|
| 2009/0009295 A1 | 1/2009 | Rofougaran et al. |
| 2009/0143104 A1* | 6/2009 | Loh et al. ................ 455/558 |
| 2012/0116887 A1* | 5/2012 | Norair ..................... 705/14.64 |
| 2013/0052953 A1 | 2/2013 | Rofougaran |
| 2013/0143492 A1 | 6/2013 | Takayama et al. |

FOREIGN PATENT DOCUMENTS

| | | |
|---|---|---|
| KR | 10-1014289 B1 | 2/2011 |
| KR | 10-2011-0022895 A | 3/2011 |
| KR | 10-1055251 | 8/2011 |
| KR | 10-1059139 | 8/2011 |

* cited by examiner

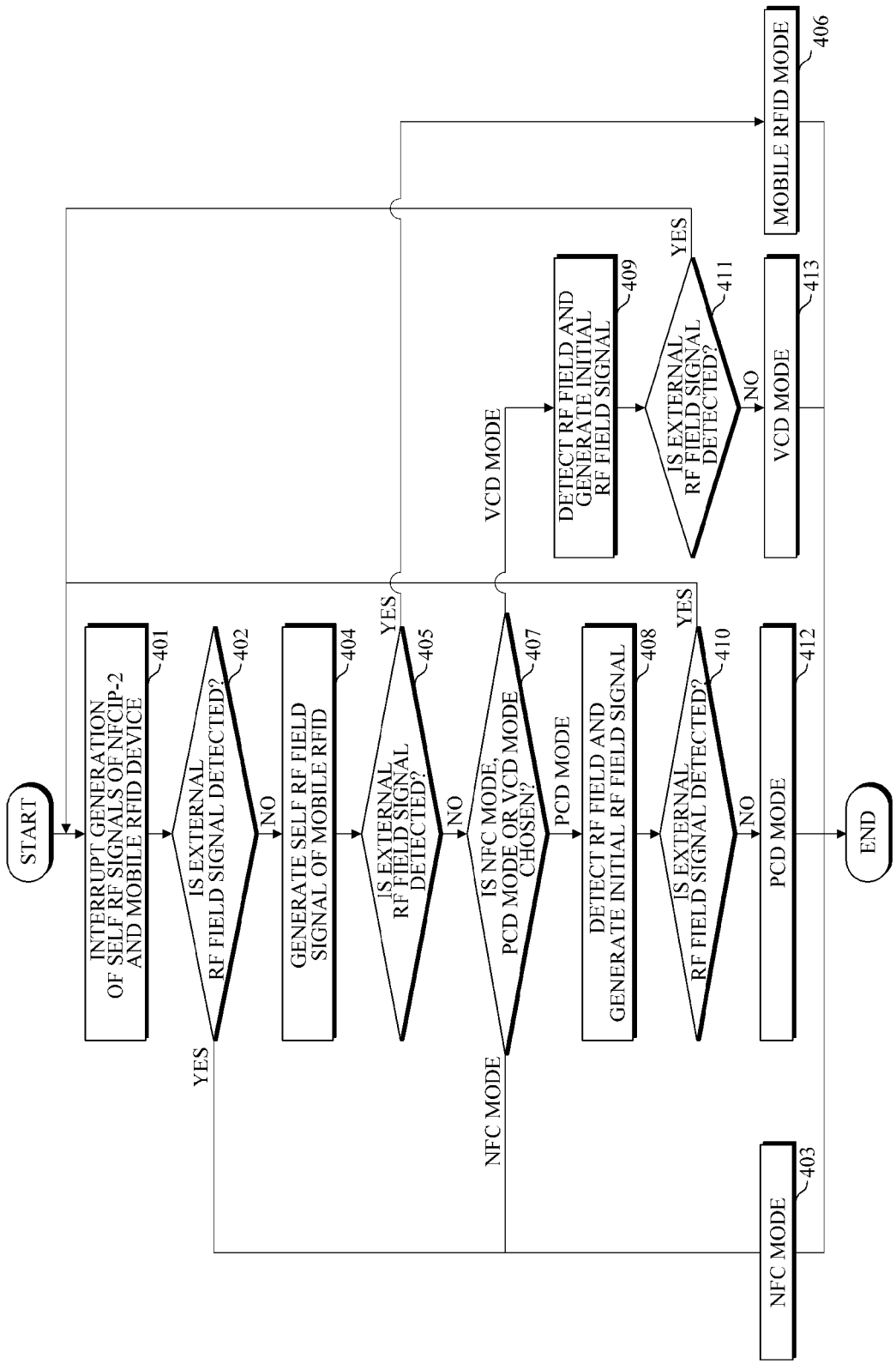

METHOD FOR CHOOSING RFID COMMUNICATION MODE AND RFID DEVICE WHICH SUPPORTS NEAR-FIELD AND FAR-FIELD COMMUNICATION

CROSS-REFERENCE TO RELATED APPLICATION

This application claims priority from a Korean Patent Application No. 10-2012-0104113, filed on Sep. 19, 2012, in the Korean Intellectual Property Office, the entire disclosure of which is incorporated herein by reference for all purposes.

BACKGROUND

1. Field

The following description relates to a method for choosing a radio-frequency identification (RFID) communication mode and an RFID device which supports near-field communication and far-field communication.

2. Description of the Related Art

RFID is a technique of reading information contained in a tag through an antenna and a reader using an electric wave, and various types of RFID communication systems are being put to practical use according to uses and purposes.

Specifically, RFID tags come in various forms including those which can store only ID information, those which have a memory area capable of storing information, those which do and do not require power sources and the like, and communication between RFID readers and tags includes various systems based on various frequency bands.

Recently, there have been attempts to implement the tag and the reader in a single device, or to implement various frequency bands in a single device by which RFID communication can be performed, thereby enabling selection according to a use or purpose.

In such a case in which various RFID communication systems are implemented in a single device, the user chooses which communication system he or she desires to use. However, if the user is not sufficiently knowledgeable on communication systems, choosing the communication system can be difficult for the user.

SUMMARY

The following description relates to solving such problems, and its purpose is to provide a method and device in which RFID communication systems having different frequency bands and communication systems are implemented in a single device, and in which the communication system is automatically chosen.

In one general aspect according to one embodiment of the invention, a method of choosing a communication mode of an RFID device may include: interrupting generation of a self radio-frequency (RF) field signal; determining whether or not an RF field signal for near-field communication is detected; choosing a near-field communication mode when an external RF field signal for near-field communication is detected; and generating the self RF field signal for far-field communication when the external RF field signal for near-field communication is not detected, and choosing the communication mode according to whether or not a response signal is received.

At this time, the choosing of the communication mode according to whether or not the response signal is received may include: generating the self RF field signal for far-field communication when the external RF field signal for near-field communication is not detected, determining whether or not the response signal to the self RF field signal for far-field communication is received, choosing the far-field communication mode when the response signal is received, and choosing the near-field communication mode when the response signal is not received.

Further, according to one embodiment, the far-field communication mode may be a mobile RFID communication mode based on a frequency band of 800 MHz or 900 MHz.

Further, according to one embodiment, the near-field communication mode may be a communication mode based on the frequency band of 13.56 MHz.

At this time, when the external RF field signal for near-field communication is detected, the choosing of the near-field communication mode may include choosing an RFID reader mode based on the frequency band of 13.56 MHz, and when the response signal is not received, the choosing of the near-field communication mode may include choosing an RFID tag mode based on the frequency band of 13.56 MHz.

Further, an RFID device which supports near-field communication and far-field communication according to one embodiment of the invention may include: a near-field communication module configured to perform near-field communication; a far-field communication module configured to perform far-field communication; and a control unit configured to choose whether or not the external RF field signal is detected and to control operations of the near-field communication module and the far-field communication module.

According to one embodiment, the control unit may include an RF field signal generation control unit configured to control the generation of self RF field signals of the near-field communication module and the far-field communication module, an RF field signal detection unit which determines whether or not an external RF field signal is detected, and a mode choice unit which chooses one of the near-field communication mode and the far-field communication mode according to whether or not the external RF field signal of the RF field signal detection unit is detected, and then controls the operations of the near-field communication module and the far-field communication module.

Further, according to one embodiment, the near-field communication module may include an RFID reader and a tag based on the frequency band of 13.56 MHz, and the far-field communication module may include the RFID reader based on the frequency band of 800 MHz or 900 MHz.

On the other hand, according to one embodiment of the invention, the RFID device which supports near-field communication and far-field communication may be contained in or mounted outside a portable terminal.

According to the invention, when the RFID communication system is implemented to operate in a single device, since the communication system can be automatically chosen without a separate operation by user, user convenience is improved.

Other features and aspects will be apparent from the following detailed description, the drawings, and the claims.

BRIEF DESCRIPTION OF THE DRAWINGS

FIG. 4 is a flowchart illustrating a process of choosing a communication mode of an RFID device when support of RFID communication under ISO/IEC 21481 and ISO/IEC 29143 is implemented according to one embodiment.

Figure 1:
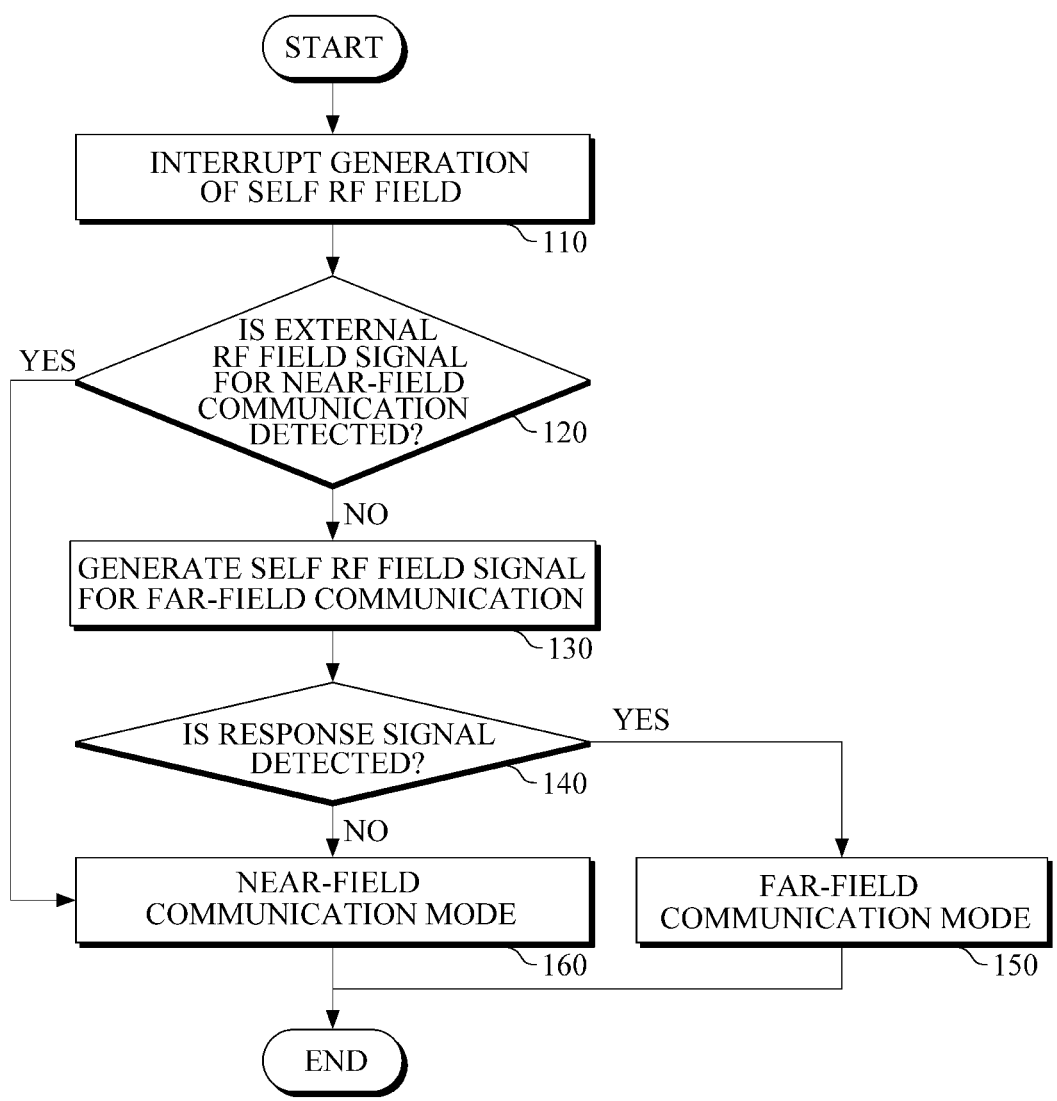
FIG. 1 is a flowchart illustrating a process of choosing an RFID communication mode according to the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be obvious to those of ordinary skill in the art. Also, descriptions of well-known functions and constructions may be omitted for increased clarity and conciseness.

Here in below, the invention will be described to enable a skilled person in the art to readily understand and reproduce through preferred embodiments with reference to the accompanying drawings.

In the following description, a more detailed description of functions and configurations which are well known and related to the invention will be omitted when it is determined that description thereof would make the gist of the embodiments according to the invention to unclear.

The terms used throughout the specification of the invention are terms defined in consideration of functions of embodiments according to the invention and can be sufficiently modified according to an intention, a custom or the like of a user or operator, and therefore definitions of the terms should be determined based on the content throughout the present specification.

FIG. 1 is a flowchart illustrating a process of choosing an RFID communication mode according to one embodiment.

Referring to FIG. 1, a method of choosing the RFID communication mode according to one embodiment of the invention may include interrupting generation of a self RF field signal (110), determining whether an external RF field signal for near-field communication is detected (120), choosing a near-field communication mode when the external RF field signal for near-field communication is detected (160), generating the self RF field signal for far-field communication when the external RF field signal for near-field communication is not detected, and choosing the communication mode according to the whether or not a response signal is received (130, 140 and 150).

Near-field communication refers to a system in which an adjacent reader and tag or two near-field communication devices communicate based on electromagnetic induction therebetween. An example of near-field communication is a contactless near-field communication system by which the reader and the tag or the two near-field communication devices are able to communicate at a distance of about 10 cm based on a frequency band of 13.56 MHz.

Further, near-field communication may be a bi-directional communication system in which the two devices which support near-field communication are the reader and the tag.

On the other hand, far-field communication refers to a communication system which the tag responds with a backscattering system for an electromagnetic wave radiated from an antenna of the RFID reader and thereby information is extracted from the tag.

Such an RFID device which simultaneously supports near-field communication and far-field communication having different frequency bands and communication systems can interrupt the generation of the self RF field signal in order to choose the communication mode (110) and determine whether or not the external RF field signal for near-field communication is detected (120).

That is, the RFID device interrupts the generation of both the RF field signal for near-field communication and the RF field signal for far-field communication, and determines whether or not it is able to operate as a tag device for near-field communication.

At this time, when the external RF field signal is detected, the RFID device operates as a tag device to bi-directionally communicate with another RFID device which operates as a tag or a reader.

Further, according to the one embodiment, the chosen near-field communication mode may be a contactless communication mode based on the frequency band of 13.56 MHz.

On the other hand, when the external RF field signal is not detected, the RFID device can generate the self RF field signal for far-field communication (130). Hereinafter, when the response signal to the self RF field signal for far-field communication is detected (140), the far-field communication mode can be chosen (150).

According to the one embodiment, the far-field communication mode may be a mode of operating as a mobile RFID reader based on the frequency band of 800 MHz or 900 MHz.

Specifically, when a mobile RFID reader generates the RF field signal containing a query, the tag transfers the response signal to the RFID reader using the RF field signal transferred from the mobile RFID reader. Accordingly, when the response signal to the self RF field signal for far-field communication is received, the far-field communication mode can be chosen to perform communication with the tag.

On the other hand, when the response signal to the self RF field signal for far-field communication is not detected, the RFID device can choose the near-field communication mode (160).

In this case, a device in the near-field communication mode operates as the reader or the tag configured to communicate with the RFID device which supports near-field communication.

Further, according to the one embodiment, the near-field communication mode may be a communication mode based on the frequency band of 13.56 MHz.

Figure 2:
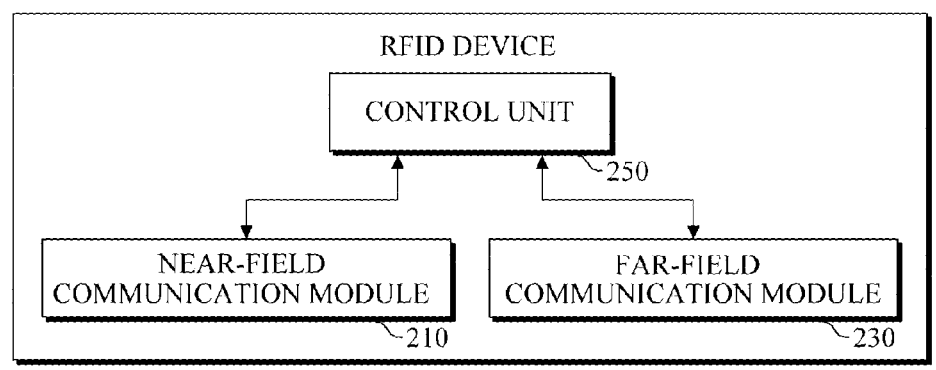
FIG. 2 is a schematic configuration diagram of an RFID device according to the invention.

FIG. 2 is a schematic configuration diagram of an RFID device according to the one embodiment.

Referring to FIG. 2, the RFID device according to one embodiment of the invention may include a near-field communication module 210 for near-field communication, a far-field communication module 230 for far-field communication, and a control unit 250 which chooses the communication mode according to whether the external RF field signal is detected and controls the operations of the near-field communication module and the far-field communication module.

The near-field communication module 210 may include the RFID reader and the tag. Specifically, the near-field communication module 210 may generate the self RF field for communicating with the external tag device, and can operate as the RFID reader when there is a response to the generated self RF field from the external tag device.

Further, when the near-field communication module 210 receives the RF field signal generated by the external RFID reader device, it can operate as the tag.

The far-field communication module 230 may include the RFID reader and the tag to perform communication with the RFID tag. Specifically, the far-field communication module 230 may generate the self RF field to communicate with the external tag, and can operate as the RFID reader when there is a response to the generated self RF field from the external tag.

Further, when the far-field communication module 230 receives the RF field signal generated by the external RFID reader, it can operate as the tag.

The control unit 250 chooses the communication mode according to whether or not the external RF field signal is detected, and can control the operations of the near-field communication module 210 and the far-field communication module 230.

Figure 3:
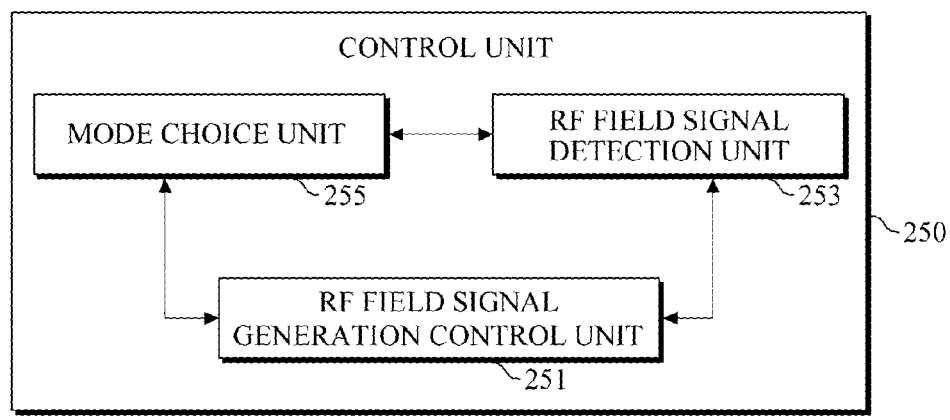
FIG. 3 is a schematic configuration diagram of a control unit according to the invention.

FIG. 3 is a schematic configuration diagram of the control unit 250 according to one embodiment.

Referring to FIG. 2 and FIG. 3, the control unit 250 according to one embodiment may include an RF field signal generation control unit 251 configured to control the generation of the self RF field signal of the near-field communication module 210 and the far-field communication module 230, an RF field signal detection unit 253 which determines whether or not the external RF field signal is detected, and a mode choice unit 255 which chooses one of the near-field communication mode and the far-field communication mode according to whether or not the external RF field signal of the RF field signal detection unit is detected, and then controls the operations of the near-field communication module 210 and the far-field communication module 230.

Specifically, the RF field signal generation control unit 251 can control the generation of the self RF field signals of the near-field communication module 210 and the far-field communication module 230. Specifically, the RF field signal generation control unit 251 can control the near-field communication module 210 or the far-field communication module 230 to generate the self RF field signal in order to determine whether or not the near-field communication module 210 and the far-field communication module 230 can operate as RFID readers in matching frequencies.

Further, the RF field signal generation control unit 251 can control so the near-field communication module 210 or the far-field communication module 230 to interrupt the generation of the self RF field signal in order to determine whether or not the near-field communication module 210 and the far-field communication module 230 can operate as the tag.

The RF field signal detection unit 253 can determine whether or not the external RF field signal is received by the near-field communication module 210 or the far-field communication module 230.

The mode choice unit 255 can control the near-field communication module 210 and the far-field communication module 230 to operate in the near-field communication mode when the RF field signal generated by the external RFID reader is detected in a state in which the generation of the self RF field signals of both the near-field communication module 210 and the far-field communication module 230 is interrupted.

At this time, the near-field communication module 210 operates as the RFID device to bi-directionally communicate with another RFID device which operates as a tag.

On the other hand, the mode choice unit 255 can control the near-field communication module 210 and the far-field communication module 230 to operate in the near-field communication mode when the external RF field signal is detected in a state in which the self RF field signal of the near-field communication module 210 is generated.

At this time, the near-field communication module 210 operates as the RFID reader.

Further, the mode choice unit 255 can control the near-field communication module 210 and the far-field communication module 230 to operate as the far-field communication mode when the external RF field signal is detected in a state in which the self RF field signal of the far-field communication module 230 is generated.

At this time, the far-field communication module 230 operates as the RFID reader.

On the other hand, each configuration of the control unit 250 illustrated in FIG. 3 can be implemented by a set of a microprocessor and software which is executed by the microprocessor, and specific operations thereof need not be clearly distinguished. The invention should be interpreted as including such cases.

On the other hand, according to the one embodiment, the RFID device which supports near-field communication and far-field communication can be mounted outside a portable terminal in a form contained in the portable terminal or in a form of a dongle.

FIG. 4 is a flowchart illustrating a process of choosing the communication mode of the RFID device when support of RFID communication under ISO/IEC 21481 and ISO/IEC 29143 is implemented according to the one embodiment.

Referring to FIG. 4, the near-field communication module 210 according to one embodiment of the invention can be implemented with an NFCIP-2 device configured to choose the communication mode according to ISO/IEC 21481, and the far-field communication module 230 can be implemented with a mobile RFID device.

At this time, the NFCIP-2 device can operate in an NFC mode specified in ISO/IEC 18092, a proximity coupling device (PCD) mode specified in ISO/IEC 14443, or a vicinity coupling device (VCD) mode specified in ISO/IEC 15693.

Further, the mobile RFID device can include the reader and the tag which are specified in ISO/IEC 29143.

An operation choice and a mode choice of the NFCIP-2 device and the mobile RFID device can be executed by the following procedures.

The NFCIP-2 device and the mobile RFID device interrupt the generation of the self RF field signal (401).

Hereinafter, when the NFCIP-2 device detects the external RF field signal in the band of 13.56 MHz (402), the NFC mode is chosen and operation is performed in the chosen mode (403).

That is, when the RF field signal generated by the external NFC device which operates as the reader is received, the NFC mode is chosen and the RFID device operates as the tag device.

On the other hand, when the NFCIP-2 does not detect the external RF field signal in the band of 13.56 MHz, the RFID device of the mobile RFID device is turned on to generate the self RF (404).

When the mobile RFID device detects the external RF field signal in the band of 800 to 900 MHz in the backscattering signal, the mobile RFID mode is chosen (405 and 406). At this time, the mobile RFID device operates as the reader to communicate with the external RFID tag.

When the mobile RFID device does not detect the external RF field signal in the band of 800 MHz, the NFCIP-2 device must choose one of the NFC mode, the PCD mode and the VCD mode (407).

When the NFCIP-2 device chooses the NFC mode, it operates in the NFC mode (403). That is, it operates as the reader configured to communicate with the external NFC device.

When the PCD mode or the VCD mode is chosen, the NFCIP-2 device generates the external RF field signal and an initial RF field signal (408 and 409) and then enters the chosen mode according to ISO/IEC 21481.

Specifically, when the NFCIP-2 device detects the external RF field signal in a predetermined time, it returns back to step 401 (410 and 411).

Further, when the external RF field signal is not detected in the predetermined time, the initial RF field signal is generated to operation is performed in the chosen mode (412 and 413).

On the other hand, the embodiment illustrated in FIG. 4 is merely an embodiment and therefore the invention is not limited thereto, but can be implemented in various forms.

The invention has been described above with respect to the preferred embodiments. It will be understood that modified forms can be implemented within a scope not departing from intrinsic characteristics of the invention. Therefore, the disclosed embodiments should be considered not in a limitative viewpoint, but in a descriptive viewpoint. The scope of the invention is defined not in the aforementioned description, but in the appended claims, and therefore all differences within an equivalent range must be interpreted as being included in the invention.

The present invention can be implemented as computer readable codes in a computer readable record medium. The computer readable record medium includes all types of record media in which computer readable data is stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented with other components or their equivalents. Accordingly, other implementations are within the scope of the following claims.

What is claimed is:

1. A method of choosing a communication mode of a radio-frequency identification (RFID) device which supports both a near-field communication mode and a far-field communication mode, comprising:
    interrupting generation of a self radio-frequency (RF) field signal;
    determining whether or not an external RF field signal for near-field communication is detected;
    choosing the near-field communication mode upon determining that the external RF field signal for near-field communication is detected;
    generating a self RF field signal for far-field communication upon determining that the external RF field signal for near-field communication is not detected;
    determining whether or not a response signal to the self RF field signal for far-field communication is received;
    choosing the far-field communication mode upon determining that the response signal is received; and
    choosing the near-field communication mode upon determining that the response signal is not received.

2. The method of claim 1, wherein the far-field communication mode is a mobile RFID communication mode based on a frequency band of 800 MHz.

3. The method of claim 1, wherein the near-field communication mode is a communication mode based on the frequency band of 13.56 MHz.

4. The method of claim 3, wherein the choosing of the near-field communication mode includes choosing an RFID reader mode based on the frequency band of 13.56 MHz when the external RF field signal for near-field communication is detected.

5. A radio-frequency identification (RFID) device which supports both a near-field communication mode and a far-field communication mode, comprising:
    a near-field communication module configured to perform near-field communication;
    a far-field communication module configured to perform far-field communication; and
    a control unit configured
    to determine whether or not an external radio-frequency (RF) field signal is detected, and
    to control operations of the near-field communication module and the far-field communication module to thereby operate the RFID device
    in the near-field communication mode upon detecting the external RF field signal in a state in which a self RF field signal of the near-field communication module is generated, and
    in the far-field communication mode upon detecting the external RF field signal in a state in which a self RF field signal of the far-field communication module is generated,
    the control unit including
    an RF field signal generation control unit configured to control the generation of the self RF field signals of the near-field communication module and the far-field communication module,
    an RF field signal detection unit configured to determine whether or not the external RF field signal is detected, and
    a mode choice unit configured to choose one of the near-field communication mode and the far-field communication mode according to whether or not the external RF field signal is detected, and to control the operations of the near-field communication module and the far-field communication module, wherein
    the mode choice unit is configured to control the near-field communication module and the far-field communication module to operate in the near-field communication mode when the external RF field signal generated by an external RFID reader is detected in a state in which the generation of the self RF field signals of both the near-field communication module and the far-field communication module is interrupted.

6. The RFID device of claim 5, wherein the RFID device is contained inside a portable terminal.

7. The RFID device of claim 5, wherein the RFID device is mounted outside a portable terminal.

8. The RFID device of claim 5, wherein the near-field communication module includes an RFID reader and a tag based on the frequency band of 13.56 MHz.

9. The RFID device of claim 5, wherein the far-field communication module includes an RFID reader configured to operate in a mobile RFID communication mode based on the frequency band of 800 MHz or 900 MHz.

* * * * *